Sept. 11, 1951

S. SMITH 2,567,242

ROLLER BEARING ASSEMBLY AND METHOD OF PRODUCING SAME

Filed July 18, 1945

INVENTOR.
SYDNEY SMITH
BY Albert Sperry.
ATTORNEY

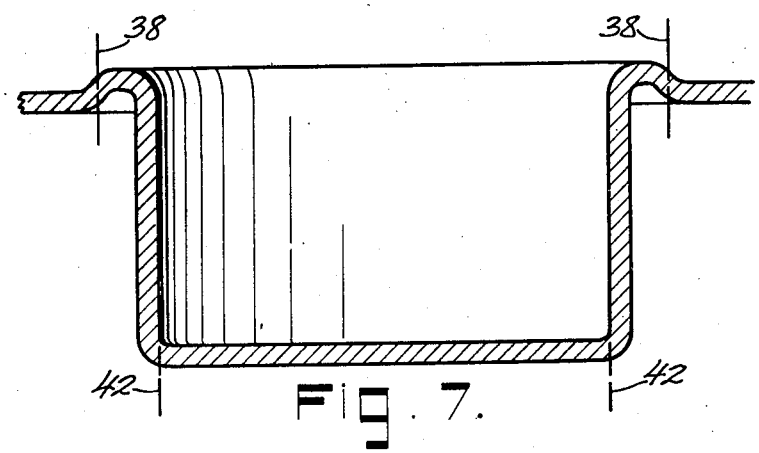
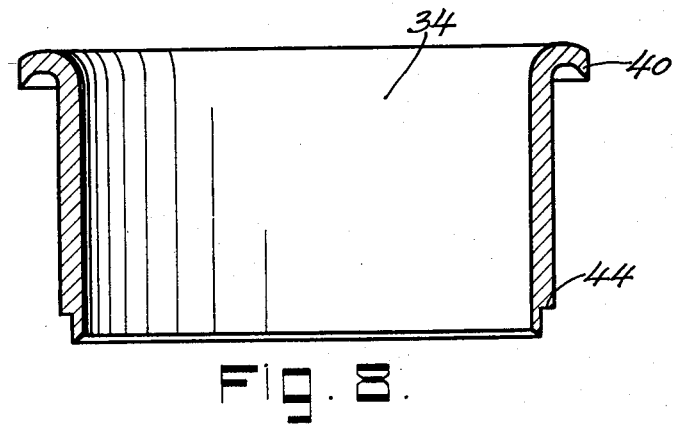
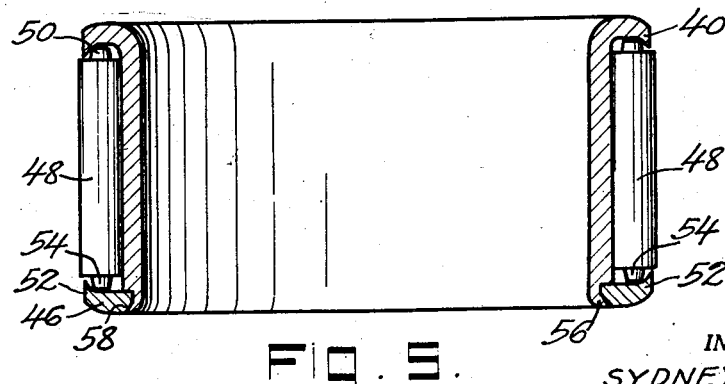

Patented Sept. 11, 1951

2,567,242

UNITED STATES PATENT OFFICE 2,567,242

ROLLER BEARING ASSEMBLY AND METHOD OF PRODUCING SAME

Sydney Smith, Lawrenceville, N. J.

Application July 18, 1945, Serial No. 605,671

2 Claims. (Cl. 308—213)

My invention relates to roller bearing assemblies wherein a complement of rollers are retained in place upon a bearing race so that the assembly can be handled and shipped as a unit. My invention relates particularly to novel constructions and methods for producing and assembling the elements of such roller bearing assemblies.

One method used heretofore in producing roller bearing assemblies of the type to which my invention relates consists in forming the outer race ring by drawing a metal blank into the form of a sleeve which is thereafter cupped and pierced at one end to provide integral roller retaining means at one end of the race for preventing radial displacement of the rollers. The opposite end of the sleeve is tapered or reduced in thickness and is then turned inward through an angle of approximately 90°. The sleeve thus formed is hardened and polished before the rollers are inserted into place. The rollers employed are formed with opposite ends of smaller diameter than the bearing surfaces of the rollers and in completing the assembly the rollers are arranged with one end thereof in engagement with the integral roller retaining means on the cupped end of the sleeve. In finishing the assembly the inwardly turned thin end of the sleeve is turned further inward until it is substantially parallel with the bearing race and overlies the opposite reduced ends of the rollers. The inturned end thus is formed into a complementary integral retaining means for the rollers and serves to hold them permanently in place preventing radial displacement of the opposite ends of the rollers and cooperating with the other retaining means to prevent longitudinal displacement of the rollers.

While this method of manfacturing roller bearing assemblies has many advantages, the step of hardening the sleeve renders the thin, reduced end thereof extremely hard and brittle. As a result the final operation of turning the end of the sleeve inward frequently causes the edge to split or chip, or to become distorted in shape as it is bent into its roller retaining position. When this occurs the surfaces engaging the rollers may be rough or irregular and therefore tend to impede the movement of the rollers or to scar the surface thereof. Moreover, the weakness inherent in the thin inturned hardened end of the sleeve renders it necessary to insert that end of the assembly into place first in order to avoid injury to the assembly in the event it is driven or forced into place in applying it to a holder or other construction. Such prior constructions have been limited to those assemblies in which the sleeve serves as the outer race ring and they render it necessary to insert the rollers by hand which is a tedious and expensive operation and does not allow for adequate inspection to eliminate rollers which may be too long and therefore cause binding of the rollers in the finished assembly.

In accordance with my invention these objections to constructions of the prior art are overcome and roller bearing assemblies provided in which the retaining means engaging both ends of the rollers may be accurately formed so as to assure proper fitting and operation of the elements and may be of sufficient thickness and strength to overcome the inherent weakness and irregularities of prior constructions. The invention also serves to extend the use of drawn steel race rings so that they may be used as either the inner or the outer race ring. Furthermore, the assembly of the rollers may be carried out by mechanical means which insure accuracy in the length of the rollers in the assembly.

These advantages are preferably attained by employing a separately formed retaining member instead of the inturned hardened end of the sleeve of previous constructions. The retaining member which is thus provided may be hardened and accurately finished independently of the sleeve and may thereafter be inserted into or applied to the end of the sleeve and secured in place for retaining the rollers in position.

One of the objects of my invention is to eliminate roughness and inaccuracies in surfaces engaged by the rollers of roller bearing assembly.

Another object of my invention is to provide novel and economical methods for producing roller bearing assemblies.

A further object of the invention is to provide roller bearing assemblies which possess greater strength and may be applied more readily to holders or other constructions.

A particular object of my invention is to provide roller bearing assemblies with a novel type of roller retaining means.

These and other objects and features of my invention will appear in the following description thereof in which reference is made to the figures of the accompanying drawing.

In the drawings:

Fig. 7 illustrates an alternative form of sleeve blank partially drawn for use in forming a typical inner race ring embodying my invention.

Fig. 8 illustrates a fully formed inner ring embodying my invention, and

Fig. 9 illustrates a finished bearing assembly embodying the race ring of Fig. 8.

Figure 1:
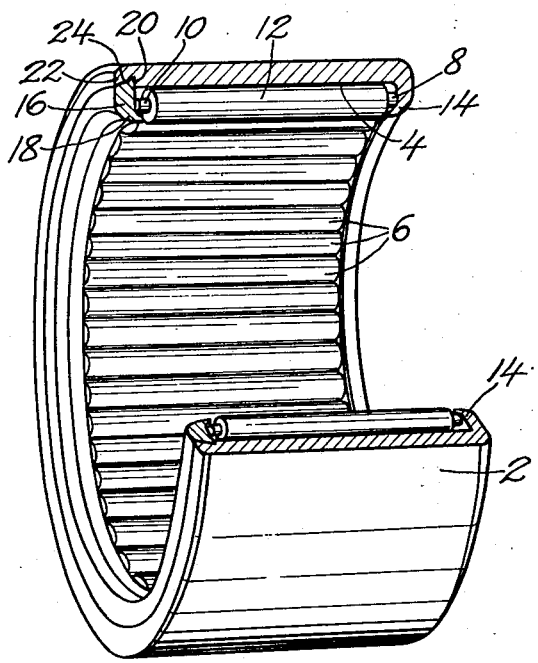
Fig. 1 is a view partly in section and partly in perspective showing a typical roller bearing assembly embodying my invention.
Figure 2:
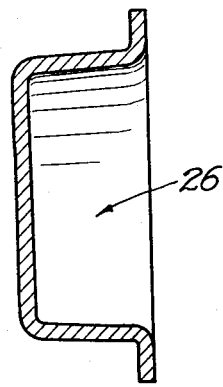
Fig. 2 is a diagrammatic sectional view through a partially formed blank used in producing the outer race ring of a typical roller bearing assembly embodying my invention.

In that form of my invention illustrated in the Figs. 1 to 6 of the drawings, the finished bearing assembly embodies a sleeve 2 which constitutes an outer race ring and presents an inwardly facing bearing surface 4 which serves as the bearing race. The race 4 is engaged by a complement of rollers 6, each of which has ends 8 and 10 of smaller diameter than the bearing surfaces 12 of the rollers. The sleeve 2 is preferably drawn from a steel blank as in prior art methods and is formed with integral retaining means 14 which are located adjacent one end of the race 4 and extend inward over the race to receive and engage the small ends 8 of the rollers to prevent radial displacement thereof.

The opposite end of the sleeve 2 is provided with a separately formed retaining member 16 which is located adjacent the opposite end of the race 4. The member 16 is annular in shape and has its inner edge 18 turned inward toward the race 4 so that it overlies the reduced ends 10 of the rollers to prevent radial displacement thereof. The retaining member 16 engages a shoulder 20 formed on the inner face of the sleeve 2 and is secured in place by the inwardly extending extremity 22 of the sleeve which extends over the bevelled peripheral edge 24 of the retaining member. The roller retaining member 16 is thus fixed in position so that it cooperates with the integral retaining means 14 on the sleeve to prevent longitudinal displacement of the rollers.

The sleeve 2 and the retaining member 16 are formed separately and are each finished and hardened before assembly so that they may be produced with the greatest accuracy. When finally secured together the extremity of the sleeve, although hardened, is turned inward over the outer peripheral edge of the retaining member 16 so that its does not engage the rollers or other movable elements of the assembly. Moreover, it is only necessary to turn the hardened edge 22 through an angle of about 30° to 45° so that there is less tendency for the edge to split or chip and any roughness which may develop is remote from the bearing surfaces.

Figure 3:
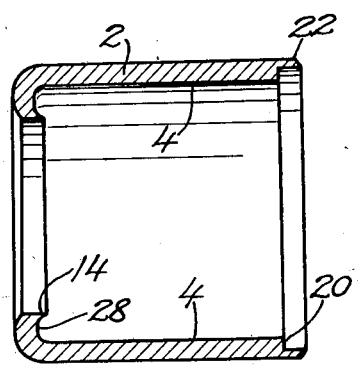
Fig. 3 is a longitudinal sectional view through a typical outer race ring embodying my invention.

In forming a roller bearing assembly of the type illustrated in Fig. 1 I prefer to produce the outer bearing race from a sleeve which is drawn from a steel blank in essentially the same manner as has been done heretofore. For this purpose the blank is first formed into a cup as shown at 26 in Fig. 2 and is then further drawn into the sleeve 2 shown in Fig. 3. Two or three successive drawing operations may be employed to produce a sleeve of the desired length and wall thickness. The base of the resulting cup shaped sleeve is then cupped to produce annular flange 28 having an annular recess therein and the center of the base of the cup is pierced out to form the inwardly turned integral retaining means 14 adjacent one end of the resulting sleeve. The inwardly facing side walls of the sleeve form the race 4 of the assembly, whereas the upper edge of the race is reamed out as shown in Fig. 3 to a depth of about one-third of the wall thickness to provide the shoulder 20. The shoulder is spaced from the end of the sleeve a distance which is slightly greater than the thickness of the retaining member 16 and the end 25 of the sleeve is bevelled at an angle of about 30° to 45° so that when the extremity 22 of the sleeve is turned inward over the peripheral edge 24 of the retaining member the edge 25 will lie flush with the outer face of the retaining member. The sleeve when thus finished may be hardened by cyaniding or nitriding operations or in any other suitable way to provide the inwardly facing outer bearing race 4 which is accurately formed for engagement with the rollers 6.

Figure 4:
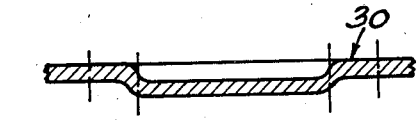
Fig. 4 is a sectional view through a typical blank used in forming a retaining member of a roller bearing assembly embodying my invention.
Figure 5:
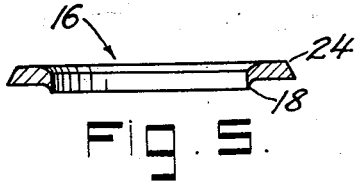
Fig. 5 is a view similar to Fig. 4 showing the blank as formed preparatory to assembly of the elements.

The retaining member 16 is preferably produced by stamping a blank 30, such as that shown in Fig. 4, from a strip of steel of the desired thickness. The blank is circular in shape and cupped at the center and thereafter is pierced and restruck to form an annular retaining member as shown in Fig. 5. This member has its inner edge 18 displaced from the plane of the blank to provide an inwardly turned portion which will overlie the reduced ends 10 of the rollers in the finished assembly. The outer peripheral edge of the blank is bevelled as shown at 24 to present a surface inclined at a suitable angle, say 30° to 45° for cooperating with the extremity 22 of the sleeve to hold the retaining member in engagement with the shoulder 20.

Figure 6:
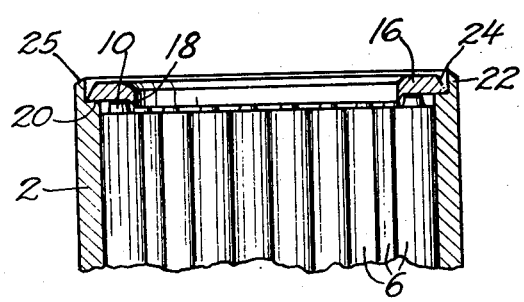
Fig. 6 is a longitudinal sectional view through an assembly of the elements prior to finishing the bearing assembly.

When the retaining member has been thus formed and before assembly with the sleeve and rollers, it is hardened and finished to present smooth, regular and accurately formed surfaces for engagement with the reduced ends 10 of the rollers. The finished and hardened elements illustrated in Figs. 3 and 5 are then assembled with the rollers as shown in Fig. 6 so that the bearing surfaces 12 of the rollers engage the inwardly facing bearing race 4 of the sleeve or outer race ring 2 and the reduced ends 8 of the rollers extend beneath the inwardly turned integral retaining means 14 of the sleeve. In assembling the rollers suitable mechanical means may be used to select and hold the rollers and to slide them into place as a group or otherwise through the unobstructed end of the sleeve thus eliminating the hand operations heretofore required. The retaining member 16 is then inserted into the end of the sleeve 2 so that it rests upon the shoulder 20 and the inturned edge 18 of the retaining member extends inward from the end of the bearing over the reduced ends 10 of the rollers. When the parts have been thus assembled the upper extremity 22 of the sleeve above the shoulder 20 is turned inward over the bevelled outer edge 24 of the retaining member to form a lip for holding the retaining member securely in place while the edge 25 of the extremity lies flush or substantially flush with the exposed face of the retaining member as shown in Fig. 1.

With this construction each of the elements of the bearing assembly may be accurately formed and hardened so that all of the surfaces engaged by the rollers are smooth and may be produced with extremely close tolerances to provide a bearing assembly of the greatest accuracy. The final assembly operation in which the tapered extremity 22 of the bearing race is turned inward over the bevelled edge 24 of the retaining member 16 requires movement of the hardened material through an angle which may be very limited and may not exceed about 30°. The tendency for the hardened material to split or chip is thus reduced and any roughness or irregularity which may result from the inward turning of the hardened material is confined to surfaces of the bearing which do not come into contact with the rollers. Furthermore, the retaining member 16 may be of suitable thickness and strength to withstand shocks and injuries to which the bearing may be subjected when it is forced or driven into place in applying the bearing assembly to a holder or other construction. For this reason the bearing may be applied with either end inserted into place first, and it is not necessary to use special care in applying the assembly. The increased accuracy in the construction of roller bearing assemblies embodying my invention renders them resistant to abuse and injury so that the life of the bearing is considerably increased and rejection of the bearings on inspection thereof is reduced to a minimum.

In that form of my invention illustrated in Figs. 7, 8 and 9 the sleeve 34 employed forms the inner race of a roller bearing assembly and preferably is drawn from a steel blank in much the same manner as outer bearing races have been produced heretofore. However, the blank when drawn has the form illustrated in Fig. 7 with the outwardly facing downwardly turned annular recess 36 so that when struck out along the lines 38 the integral retaining means shown at 40 in Figs. 8 and 9 are produced on the sleeve. The central portion of the drawn sleeve is pierced along the lines 42 and the outer edges of the resulting tubular construction are reamed or reduced in thickness to form the outwardly facing shoulder 44 for receiving the retaining member 46.

As previously described the sleeve and retaining member may be separately formed and hardened with the desired accuracy after which the rollers 48 may be arranged with the reduced ends 50 thereof projecting beneath the integral retaining means 40 on one end of the sleeve and the retaining member 46 is then slipped over the opposite end of the sleeve so as to rest against the shoulder 44. When in this position the outer peripheral edge 52 of the retaining member 46 overlies the reduced ends 54 of the rollers 48. The extremity 56 of the sleeve is then turned outward over the bevelled inner edge 58 of the retaining member 46 to hold the retaining member securely in place. In this way the sleeve 34, the rollers 48 and the retaining member 46 can be assembled and secured together to provide an accurate and strong roller bearing assembly which is economical to produce and present smooth bearing surfaces for engagement with the rollers.

While I have illustrated and described a preferred form of roller bearing assembly embodying my invention, it will be apparent that numerous changes in the form, construction and arrangement of the elements employed may be made without departing from the spirit of my invention. Therefore it should be understood that the embodiment thereof herein shown and described is intended to be illustrative only and is not intended to limit the following claims.

I claim:

1. A needle roller bearing assembly embodying a race ring consisting of a drawn steel sleeve having one end thereof turned over to form an annular roller retaining means, said sleeve being substantially uniformly hardened throughout its surface and presenting a cylindrical surface forming a bearing race, a complement of needle rollers engaging said race and having reduced ends located beneath said annular roller retaining means, the opposite end of said sleeve being formed with a shoulder and having a portion of reduced thickness extending beyond said shoulder, an annular retaining member engaging said shoulder and presenting one annular edge extending over the opposite reduced ends of said needle rollers, the opposite annular edge of said retaining member being beveled not greater than approximately 30° to 45° and the reduced hardened extremity of said sleeve beyond said shoulder being turned over the beveled edge of the retaining member and serving to hold said retaining member and needle rollers in place.

2. The method of producing a bearing assembly of needle rollers having their opposite ends reduced, which comprises the steps of forming a metal blank into a sleeve having an annular needle roller-retaining flange on one end, reaming the opposite end of said sleeve to form an annular shoulder and a reduced extremity, hardening the sleeve when thus formed, thereafter placing a complement of needle rollers in engagement with the inner cylindrical surface of said sleeve with adjacent reduced ends on the needle rollers engaged and positioned by said needle roller-retaining flange, thereafter placing on said shoulder an annular needle roller-retaining member having an inner edge portion thereby overlying the adjacent reduced ends of the needle rollers, said annular needle roller-retaining member having its outer periphery bevelled approximately 30° to 45°, and thereafter displacing said reduced extremity of the sleeve against the bevel of said outer periphery.

SYDNEY SMITH.

REFERENCES CITED

The following references are of record in the file of this patent:

UNITED STATES PATENTS

| Number | Name | Date |
| --- | --- | --- |
| 1,143,479 | Abbott, Jr. | June 15, 1915 |
| 1,489,013 | Schatz | Apr. 1, 1924 |
| 1,911,336 | Ackerman | May 30, 1933 |
| 2,038,474 | Brown | Apr. 21, 1936 |
| 2,057,102 | Lemell | Oct. 13, 1936 |
| 2,078,739 | Slaght | Apr. 27, 1937 |
| 2,301,399 | Heim | Nov. 10, 1942 |
| 2,383,727 | Lewis | Aug. 28, 1945 |